United States Patent Office 3,485,748
Patented Dec. 23, 1969

3,485,748
PROCESS FOR THE SELECTIVE SORPTION OF PARAFFINS AND OLEFINS
Paul E. Eberly, Jr., and Dorothy Webb, Baton Rouge, La., assignors to Esso Research and Engineering Company, a corporation of Delaware
No Drawing. Filed Jan. 18, 1968, Ser. No. 698,726
Int. Cl. C10g 25/04
U.S. Cl. 208—310                                    10 Claims

ABSTRACT OF THE DISCLOSURE

This invention relates to a process for the selective sorption and separation of paraffins or olefins, or both, from admixture with other hydrocarbons. Paraffins or olefins, or both, are readily adsorbed and separated from admixture with aromatic hydrocarbons by passage of the mixture through an activated or aluminum-deficient form of mordenite, characterized as one having a $SiO_2:Al_2O_3$ molar ratio above about 25:1, and preferably at least about 65:1, and greater.

---

Certain zeolites, both natural and synthetic, have become well known to the art because of unique properties which make them effecitve as molecular sieves. Zeolites are crystalline structures characteristically described by the sodium (or other alkali or alkaline earth metal), silica, and alumina content, particularly the latter, viz., the $SiO_2:Al_2O_3$ molar ratio. Such structures useful as molecular sieves are those permeated with three-dimensional anionic networks having interstitial channels or pores. The pores have essentially a uniform cross-section which permits entry of molecules of smaller effective cross-sectional diameter therein, and within which they are adsorbed or otherwise retained. The relatively larger molecules, on the other hand, are unable to pass into the smaller pores and are not retained, but passed. Hence, molecular sieve separations involve the selective sorption and separation of different molecules from admixture, one with another, on the basis of molecular size.

Other types of adsorbents are also known to the art, and can also be used as a means for separation of different molecules. Separations, however, are not based on molecular size differences but on other properties, such as different adsorption characteristics. For example, mixtures of molecules of different adsorption characteristics can be contacted with such materials so that one type of molecule will be adsorbed to a greater extent than another. The molecule of lesser affinity will be preferentially passed, and therefore separations can be made. Other materials show separation selectivities based on other properties.

Mordenite is a crystalline sodium alumino silicate mineral having the general formula $$M_{2/n}O:Al_2O_3:(SiO_2)_y:(H_2O)_z$$

wherein M is a monovalent metal, a divalent metal or hydrogen, $n$ is the valence of M, $y$ is a number ranging from about 6 to about 12, and $z$ is a number ranging from 0 to about 12. M is generally an alkali or alkaline earth metal, most often potassium, sodium, calcium, strontium, or magnesium. A specific compound can be represented by the general formlua $Na_8Al_8Si_{40}O_{96} \cdot 12H_2O$. It occurs in nature, but can also be made synthetically. The molar ratio of silica:alumina is thus about 10:1. It is further characterized as an orthorombic structure with unit cell dimensions of $a=18.13$, $b=20.49$, and $c=7.52$ Angstrom units, and the main building blocks are four- and five-membered rings composed of $SiO_4$ and $AlO_4$ tetrahedra, arranged so that the resulting crystal contains a plurality of separate openings running parallel with the fiber axis of the crystal. The openings are of elliptical cross-section, with a major and minor diameter of 6.95 and 5.81 Angstrom units, respectively. The arrangement appears quite similar to a bundle of tubes, and is one dimensional as compared with conventional molecular sieves.

Natural mordenite is generally not a good adsorbent, and synthetic sodium mordenites are generally poor adsorbents. Despite the relatively large openings, the effective size of the openings is apparently quite low, especially in the natural mordenite. Stacking faults also account for this deficiency. In any event, these minerals can be treated, e.g., with ammonia, so that adsorption properties are greatly improved. It is known, for example, that treated mordenites become adsorbents for normal paraffins, cycloparaffins, and aromatics. The selectivity required for separation of these materials, however, is entirely lacking.

It is often desirable or necessary to purify aromatic streams containing varying amounts, often very minor amounts, of paraffins, unsaturated hydrocarbons, or mixtures of these and other hydrocarbons. Such separations are extremely difficult to accomplish by known techniques. Adsorption techniques are generally unsatisfactory, and where selectivity is shown, nearly all solid adsorbents preferentially adsorb aromatic compounds in preference to olefins and paraffins.

The primary objective of this invention, therefore, is to obviate these and other difficulties. In particular, it is an object to provide a process for the selective sorption of paraffins or olefins, or both, from admixture with other hydrocarbons. More particularly, it is an objective to provide a process wherein paraffins or olefins, or both, are readily adsorbed and separated from admixture with aromatics.

These and other objects are achieved in accordance with the present invention which contemplates a process wherein a stream of paraffins or olefins, or both, in admixture with other hydrocarbons, is readily sorbed when the stream is passed through a mass of activated, or aluminum-deficient, mordenite. The mineral mordenite, in activated form, adsorbs paraffins and olefins, whether in liquid or vapor phase, much more strongly than aromatics. This is particularly so where the paraffin or olefin contains at least one more carbon atom in the total molecule than does the aromatic compound. This behavior, which is believed entirely different from other materials, provides a very satisfactory means of sorbing paraffins and olefins from mixed hydrocarbon streams, especially those containing aromatics.

Mordenite can be activated by removal of the aluminum to form aluminum-deficient (or high silica) mordenite suitable for effecting the separation of paraffins and olefins from aromatic hydrocarbons by selective sorption of the paraffins and olefins. Activation can be carried out by a severe acid treatment. The silica:alumina molar ratio is raised by boiling the mineral in acid for a time sufficient to remove aluminum and produce a mordenite with a silica:alumina molar ratio ranging greater than about 25:1. In addition, sodium ions (or other alkali or alkaline earth metal ions) are also replaced by protons and hence the mordenite can also be termed a hydrogen aluminum-deficient mordenite. The amount of hydrogen in the structure decreases, however, as the silica:alumina ratio increases becoming very small with ratios of 65 and greater. In any event, mordenite having a silica:alumina molar ratio of below about 25:1 is inactive for purposes of this invention, but as the silica: alumina molar ratios increase above this figure, the mordenite becomes active. At silica:alumina molar ratios of about 65:1, the mordenite is highly active, and is most effective at even higher silica:alumina molar ratios ranging above about 90:1, and higher.

Mineral acids have been found suitable for activation of the mordenite. The mordenite can be boiled at ambient conditions in solutions of such acids as hydrochloric, nitric, sulfuric, and the like at concentrations ranging from about 0.1 to about 12 normal, preferably from about 1 to about 6 normal. The strength of the acid and duration of the treatment are selected to achieve the severity necessary to accomplish the desired result. The so-treated mordenite is then heated and calcined to dryness at temperatures ranging generally from about 200° F. to about 1200° F.

Though applicants know of no complete explanation for this phenomenon, it appears that the activation removes obstructing atoms, perhaps impurities, from the elliptical shaped openings creating cracks and crevices which become accessible to paraffin and olefin hydrocarbons. Perhaps, also, as the relatively large sodium ions are displaced by protons, the flow paths become effectively larger, permitting greater freedom of movement of the aromatics passing through the structure. In any event, the adsorption capacity of mordenite for paraffins, olefins, and aromatics is greatly increased by the acid treatment. The mineral exhibits stronger retention properties for paraffins and olefins than for aromatic molecules. This retention is sufficiently strong so that a good practical separation of paraffins and olefins from aromatics can be achieved. The desorption or removal of paraffins and olefins is much faster on aluminum-deficient mordenite than on mordenite of conventional ratio. This constitutes a definite process advantage for it is known that regeneration or desorption is often quite troublesome in cyclic operations.

The activated mordenite of this invention can be used under generally conventional conditions. Paraffin or olefin containing hydrocarbon streams can be passed through a fixed or moving bed at relatively low temperatures or at relatively high temperatures ranging to just below that of thermal cracking, under process conditions of flow and pressure, of the least stable hydrocarbon of the mixture. For example, at ambient conditions temperatures range on the order of from about 0° F. to about 400° F., and higher. Preferably, a temperature is selected which will maintain the stream in vapor phase and close to the boiling point of the stream being processed, so that faster equilibration can be obtained. Pressure is not critical and can range from below atmospheric through supra-atmospheric.

In a practical operation, generally two or more adsorption beds are employed. In a first bed, a feed stream is passed therethrough to remove paraffins or olefins, or both, while simultaneously in a second bed the mordenite is being regenerated. Paraffins or olefins are removed, e.g., from an aromatic stream so that the effluent stream is substantially enriched in aromatic frequently producing pure aromatics. When the paraffins and olefins begin to appear in excessive concentrations in the effluent stream, the feed stream is diverted to the second bed which had previously been regenerated. The adsorbed material in the first bed, usually amounting to about 7 to 10 weight percent of the mordenite, is enriched in paraffins or olefins, or both, and can be removed and recovered by any of a number of conventional regeneration or desorption techniques such as stripping with nitrogen, ammonia, steam, vacuum desorption, heating, displacement exchange or the like. Steam desorption has shown no degradation of the material to temperatures ranging as high as about 800° F.

The following selected non-limiting examples bring out the salient features of the invention. These demonstrate the processing of various paraffin and olefin-containing hydrocarbon streams formed from especially difficult to separate binary mixtures and from high purity chemical compounds to assure experimental accuracy.

Examples

In processing these streams, a fixed bed of mordenite having 90:1 $SiO_2:Al_2O_3$ molar ratio is packed within a tubular column, provided with heating means to maintain a temperature of 200° F. The tubular column is provided with bottom inlet and top outlet means for the introduction and withdrawal of the process streams, and for steam desorption. An auxiliary vessel, or saturator, is charged with the binary liquid and held at 65° F. prior to passage to the mordenite-containing column. To introduce the binary liquid to the column as a vaporized stream, helium is passed through the saturator. The compositions of both the liquid and resulting vapor, in mole percent, are given in the table below, at columns two and three opposite column one which arbitrarily lists a number for the selected run. Column four lists the preferentially adsorbed component of the stream. In each instance the non-aromatic hydrocarbon is preferentially adsorbed and separated from the respective aromatic compound.

After breakthrough and steady state conditions have been reached, the hydrocarbon feed to the column is stopped. Column five lists the adsorption capacity of the activated mordenite in millimoles of adsorbed hydrocarbon per gram of adsorbent. Following an individual run, the mordenite bed is successfully regenerated by passage of a water-saturated stream of helium over the mordenite at 200° F. to 500° F. The mordenite is then dehydrated with helium at 800° F. and, following this treatment, the bed is reduced to operating temperature.

| Run No. | Liquid Feed Composition, Mole Percent | Vapor Feed Composition, Mole Percent | Preferentially Adsorbed Component | Adsorption Capacity, Mmoles/g. |
|---|---|---|---|---|
| 1 | 6.67 n-Octane, 93.33 Toluene | 3.4 n-Octane, 96.6 Toluene | n-Octane | 0.78 |
| 2 | 7.45 n-Heptane, 92.55 Toluene | 11.58 n-Heptane, 88.42 Toluene | n-Heptane | 0.72 |
| 3 | 9.66 n-Heptane, 90.34 Benzene | 4.72 n-Heptane, 95.28 Benzene | do | 0.95 |
| 4 | 6.34 3-Methylhexane, 93.66 Benzene | 4.12 3-Me-hexane, 95.88 Benzene | 3-Me-hexane | 0.94 |
| 5 | 10.99 Methylcyclohexane, 89.11 Benzene | 7.25 Me-cyclohexane, 92.75 Benzene | Me-cyclohexane | 0.85 |
| 6 | 4.15 Cyclohexane, 95.85 Benzene | 4.15 Cyclohexane, 95.88 Benzene | Cyclohexane | 0.95 |
| 7 | 3.60 Hexene-1 96.40 Benzene | | Hexene-1 | 1.05 |
| 8 | 6.67 n-Octane, 93.33 Toluene | 3.4 n-Octane, 96.6 Toluene | n-Octane | 0.70 |

From the foregoing series of data it is found by G. C. analysis that pure toluene is produced from binary mixtures containing not only 3.4 percent of n-octane, but even from binary mixtures containing almost 12.0 percent n-heptane. Pure benzene is produced from binary mixtures containing various quantities of such paraffins as n-heptane, 3-methylhexane and methylcyclohexane. Moreover, pure benzene is obtained from mixtures containing paraffins of similar carbon number such as cyclohexane, and olefins such as hexene-1. This later separation is extremely effective since all of the hexene-1 is adsorbed on the solid and only pure benzene issues from the column. Introducing some degree of unsaturation in the paraffin hydrocarbon is found to enhance the effectiveness of separation from the aromatic.

A feature of this invention is that separations can be made of compounds of identical carbon numbers, i.e., compounds having the same number of carbon atoms in the total molecule. It is observed, e.g., that n-heptane can be separated from toluene and cyclohexane and hexene-1 from benzene. More effective separations are made, however, where the paraffinic hydrocarbon is at least one carbon number higher. Adsorption capacities, it is demonstrated, are at least equivalent to conventional molecular sieves and desorption and regeneration can be effected with little loss in capacity.

To further demonstrate the invention, binary mixtures of n-octane and toluene as described by reference to Run 1 are used to evaluate a series of mordenites. Repeating Run 1 in all details except as regards the specific mordenite, it is found that untreated mordenite and even partially treated mordenite having a $SiO_2:Al_2O_3$ molar ratio of 25:1 show no selectivity. No separations are observed. Mordenite treated to provide a $SiO_2:Al_2O_3$ molar ratio of 66:1, however, is nearly as effective as in Run 1 in making the desired separation. Adsorption capacity is essentially the same as with mordenite having a $SiO_2:Al_2O_3$ molar ratio of 90:1.

In view of these data it is quite clear that severe acid treatment produces highly crystalline aluminum-deficient mordenites which represent essentially new forms of silica. These materials have greatly reduced acidity and offer considerably lower diffusion resistances to hydrocarbon molecules than conventional mordenites. Moreover, the aromatics are desorbed at surprisingly fast rates: For example, it is found that toluene is desorbed at a considerably faster rate than n-octane. This unusual behavior, which is just the opposite of conventional materials, makes feasible extremely practical operations wherein paraffins and olefins are selectively and preferentially strongly adsorbed and thence readily separated from other hydrocarbons such as aromatics.

The process of this invention makes feasible the separation of paraffins from various hydrocarbon mixtures. Normal saturated hydrocarbons, branched chain aliphatic hydrocarbons, and cyclic paraffins can be readily adsorbed and separated from admixture with aromatic hydrocarbons, including monocyclic, polycyclic and cyclosubstituted aromatics, whether substituted or unsubsituted and whether the substitution occurs within the ring itself or in a side chain. Olefins can also be separated from the aforementioned aromatics, whether monoolefins or polyolefins, whether straight chain or branched chain, whether conjugated or unconjugated, whether internally unsaturated or terminally unsaturated, and whether substituted or unsubstituted. Substituting elements are, for example, halogen, such as bromine or chlorine, amino, alkyl, and the like.

Many commercial types of separations are feasible. Such separations are feasible in removing straight chain hydrocarbons from steam cracked naphthas containing large amounts of aromatics to improve octane rating. Paraffins can be removed from toluene obtained, e.g., from coke oven light oil, to produce high quality nitration grade toluene. Paraffins and olefins can be removed from various by-product streams, and hence the process is useful for improving the quality of products obtained from reformer, isomerization, alkylation and polymerization techniques generally.

Exemplary of paraffins which can be separated from admixture with aromatics are the normal paraffins such as butane, hexane, octane, nonane, hendicane, tridecane, pentadecane, heptadecane, nonadecane, eicosane, docosane, tricosane, pentacosane, triacontane and the like; branched paraffins such as isobutane, 2,2-dimethylpropane, 2,2-dimethylpentane, 2-methylheptane, 2,3,3-trimethylpentane, 4-propylheptane, 3-ethyloctadecane, 2-methyl - 4 - isobutylhexadecane, 2,2-dimethyldocosane, 9 - octyldocosane and the like; and cycloparaffins such as methylcyclopropane, 1,1,2-trimethyl - 2 - ethylcyclopropane, 1,2 - dimethyl - 3,4 - diethylcyclopropane, amyl cyclopentane, decyl cyclopentane, 1-methyl-3-octadecylcyclopentane, tetradecylcyclohexane, 2,5-dimethyl-5-cyclohexylheptane, 5-cyclohexyleicosane, bicyclohexane, 1,1-dimethylbicyclohexane, bicycloheptane, propyl decalin, and the like.

Exemplary of aromatics from which paraffins or olefins, or both, can be separated are benzene, toluene, p-xylene, ethyl benzene, 1,3-dimethyl-2-ethylbenzene, isopropyl benzene, t-butyl benzene, 1-phenyl hexane, 1,2,3,5-tetraethylbenzene, tri-amyl benzene, tetra-amyl benzene, and the like.

Exemplary of olefins which can be removed from aromatics are monoolefins such as 3-hexene, 4-methyl-2-pentene, 2-methyl-1-hexene, 3,3-dimethyl-1-heptene, 6-methyl-3-ethyl-2-heptene, 1-undecene, 2-propyl-1-nonene, 4-butyl-2-octene, 5-butyl-4-nonene, 9-methyl-7-pentadecene, 1-octadecene, 9-octyl-8-heptadecene, 7-triacontene, 3-pentadecyl-2-octadecene, and the like; diolefins such as 1,3-butadiene, 2,3-pentadiene, 1,5-hexadiene, 5-methyl-1,4-hexadiene, 2-methyl-1,6-heptadiene, 3-methyl-1,5-octadiene, 2,6,8 - trimethyl - 2,6 - nonadiene, 4-butyl-1,10-undecadiene, 9,25-tetra-triacontadiene, and the like; and tri olefins such as 2,4,6-octatriene, 2,6-dimethyl-1,3,5-heptatriene, 2,6-dimethyl-1,5,8-undecatriene and the like.

It is apparent that various modifications and changes can be made without departing from the spirit and scope of the invention.

Having described the invention, what is claimed is:

1. A process for the separation and recovery of hydrocarbons selected from paraffins and olefins from admixture with other hydrocarbons comprising passing said mixture through a bed of aluminum-deficient mordenite characterized as having a $SiO_2:Al_2O_3$ molar ratio of above about 25:1 to preferentially adsorb the said paraffins and olefins from the hydrocarbon mixture.

2. The process of claim 1 wherein the aluminum-deficient mordenite is one having a $SiO_2:Al_2O_3$ molar ratio above about 65:1.

3. The process of claim 1 wherein the hydrocarbon mixture is in vapor phase when passed through the bed of mordenite.

4. The process of claim 3 wherein the temperature of the hydrocarbon mixture is maintained near its boiling point.

5. The process of claim 1 wherein paraffin hydrocarbons are separated from admixture with aromatic hydrocarbons.

6. The process of claim 1 wherein olefin hydrocarbons are separated from admixture with aromatic hydrocarbons.

7. The process of claim 1 wherein the paraffin and olefin hydrocarbons differ by containing at least one more carbon atom in the total molecule than the other hydrocarbons constituting the mixture.

8. The process of claim 1 wherein the mordenite is acid-treated to produce the aluminum deficiency.

9. The process of claim 8 wherein a mineral acid is used in the treatment.

10. The process of claim 1 wherein the mordenite is regenerated by removal of the sorbed hydrocarbons.

References Cited

UNITED STATES PATENTS

| 3,078,643 | 2/1963 | Milton | 260—676 |
| 3,360,582 | 12/1967 | Mattox | 208—310 |

HERBERT LEVINE, Primary Examiner

U.S. Cl. X.R.

252—455; 260—676, 677